(12) United States Patent
Greeff et al.

(10) Patent No.: US 8,347,319 B2
(45) Date of Patent: Jan. 1, 2013

(54) DEVICE DISPLAY OBJECT INFRASTRUCTURE

(75) Inventors: Esaias Engelbertus Greeff, Redmond, WA (US); Douglas K. Brubacher, Sammamish, WA (US); Narayanan Ganapathy, Redmond, WA (US); Randall E. Aull, Kenmore, WA (US); Doron J. Holan, Seattle, WA (US); Neil Sandlin, Redmond, WA (US); James G. Cavalaris, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1259 days.

(21) Appl. No.: 12/125,907

(22) Filed: May 22, 2008

(65) Prior Publication Data

US 2009/0293070 A1    Nov. 26, 2009

(51) Int. Cl.
*G06F 13/00*      (2006.01)
*G06F 3/00*       (2006.01)

(52) U.S. Cl. .................................... 719/321; 719/327

(58) Field of Classification Search .................. None
See application file for complete search history.

(56) References Cited

U.S. PATENT DOCUMENTS

| | | | |
|---|---|---|---|
| 6,216,196 B1 | 4/2001 | Elwell et al. | |
| 6,272,576 B1 | 8/2001 | Porterfield | |
| 6,282,586 B1 | 8/2001 | Bullough | |
| 6,735,756 B1 | 5/2004 | Linn et al. | |
| 6,886,049 B2 | 4/2005 | Wong | |
| 7,124,226 B2 | 10/2006 | Khanna | |
| 2004/0042027 A1 | 3/2004 | Timperman et al. | |
| 2005/0004974 A1 | 1/2005 | Sharma et al. | |
| 2005/0149639 A1 | 7/2005 | Vrielink et al. | |
| 2005/0187924 A1 | 8/2005 | Brubacher et al. | |
| 2007/0027879 A1 | 2/2007 | Bridges et al. | |

OTHER PUBLICATIONS

PnP-X: Plug and Play Extensions for Windows; A Windows Rally Specification; Version 1.0c; Jan. 11, 2007; 33 pages.*
Toby Nixon; Directions on the Windows® PC and Network Device Connectivity; Oct. 2004 UPnP Summit Presentations—China; 29 pages.*
Using Windows Rally Vertical Pairing to Automatically Install Wi-Fi Devices; Jan. 15, 2010; 34 pages.*
How to manage devices in Windows XP; Jul. 6, 2006; archived Apr. 22, 2007; retrieved Dec. 15, 2011; 3 pages.*
Windows 7—Association Database; http://www.microsoft-questions.com/microsoft/Windows-Devices-PNX/29180498/association-database.aspx; Feb. 2007; 8 pages.*
Network Explorer Extensibility; Jun. 7, 2006; 6 pages.*
"Enabling User Customization", Oracle Application Server Wireless Developer's Guide, Oracle Corporation, 2003 pp. 16.

(Continued)

*Primary Examiner* — H. S. Sough
*Assistant Examiner* — Kimberly Jordan

(57) ABSTRACT

Multi-function devices expose multiple functions to device drivers or other lower-level software. Device function providers can interface with such drivers or lower-level software and can provide information, including device identifiers regarding such functions, to a device display object infrastructure. A device display object can then be created that encompasses one or more functions such that, in one embodiment, the device display object corresponds to a single, physical multi-function device. Alternatively, any combination of functionality from one or more physical devices can be combined into a single device display object representing a virtual multi-function device. Properties of the device display object can be set with reference to user-specified settings, remotely maintained metadata, locally available metadata, and information associated with each function. Functions can be ranked such that, if there is a conflict, information from more highly ranked functions is used to set the properties of the device display object.

19 Claims, 5 Drawing Sheets

OTHER PUBLICATIONS

"Modular Object Scanning Technology", Version 1.10, User Manual, FabSoft, Inc., 2006, pp. 1-26.

U.S. Appl. No. 12/002,060, filed Dec. 14, 2007 Inventor(s) Dolon, et al., entitled "Multi-function device ID with unique identifier".

* cited by examiner

DEVICE DISPLAY OBJECT INFRASTRUCTURE

BACKGROUND

To provide added functionality, computing devices have been traditionally capable of communicating with peripheral devices. Such peripheral devices include output devices, such as printers, fax machines and speakers, input devices, such as scanners, digital cameras and microphones, and extension devices, such as personal digital assistants, digital music players, hard drives, and flash-based storage drives. Peripheral devices are traditionally connected to a computing device via one or more transports, such as a wireless or wire-based transport. The communicational coupling enables the computing device to utilize some or all of the functionality of the peripheral device.

From the perspective of the computing device, each peripheral device performs one or more discrete "functions." The computer can discover these functions through software components, such as a device driver, that are associated with a specific transport or with a specific type of peripheral device. The device driver may contain instructions to configure the function, obtain status information about the function or control operation of the function. These capabilities to interact with the peripheral device through the device driver may be exposed to a user of the computer through one or more user interfaces, such as a "control panel" or other visual interface, or through programmatic interfaces that can be utilized by higher-level software executed on the computing device by the user.

More recently, peripheral devices, often referred to as "multi-function devices", are capable of performing multiple independent functions. For example, a device may provide printing, scanning and faxing functionality in a single physical package. Each individual function, however, remains associated with a distinct driver. Thus, when a multi-function device is connected to a computing device, the computing device recognizes the individual functions, but there is no generic mechanism by which they can be grouped into a single cohesive construct. The user, therefore, perceives a single physical peripheral device, but yet is presented with multiple independent functions on the computing device, none of which completely, or often even accurately, represent the whole multi-function peripheral device.

SUMMARY

As individual drivers or other software recognize and receive information regarding the individual functions of a multi-function device, they can also receive identifiers that can provide indicators that the individual functions are being provided from a single physical device. For example, the functions reported by the multi-function device can each be associated with a device, or "container", identifier and, more specifically, with the same device identifier. Alternatively, the drivers or other software communicating with the multi-function device can derive device identifiers and, while performing such a derivation, can associate the multiple function of a multi-function device with the same device identifier. The mere existence of such a common device identifier across multiple functions, however, may not be sufficient to provide a user experience commensurate with users' expectations. In particular, given a single physical device, even a multi-function one, users would expect that user interfaces would indicate only one device.

In one embodiment, therefore, a single "device display object" is created and maintained to encompass at least some of the multiple functions of a single multi-function device. The functions encompassed by the device display object can be enumerated and provided by device function providers that can interface with existing drivers or other software designed to communicate with the multi-function device and utilize its individual functions. Such device function providers can be tailored to specific types of devices, drivers, or communicational methodologies and can provide identification information from devices to a centralized device display object infrastructure, which can, in turn, create and maintain one or more device display objects based on the data provided.

In another embodiment, the device display object can comprise metadata obtained from any one or more of a multiple of sources, including metadata resident locally on the computing device and remotely stored metadata. The metadata can supplement information provided by the device function providers with respect to individual functions. In addition, metadata applicable to the whole device can likewise be incorporated into the device display object. Such device metadata can be obtained from one or more multiple sources or it can be derived from individual function metadata.

In a further embodiment, the individual functions associated with a device display object can be ranked such that higher ranked functions can define aspects of the device display object. For example, function metadata from a highly ranked function can be used as the device metadata if no device-specific metadata is available. Likewise, the functions associated with a device display object can be used to assign a category or type to the device represented by the device display object.

In a still further embodiment, the device display object can enable a user to adjust various settings to suit their own preferences. For example, the device display object can provide "show/hide" support, thereby enabling a user to select whether one or more user interfaces, including higher-level software applications, display the existence of the multi-function device to the user. Similarly, the user can assign a name to the multi-function device and adjust other settable properties, which can, likewise, be associated with the device display object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
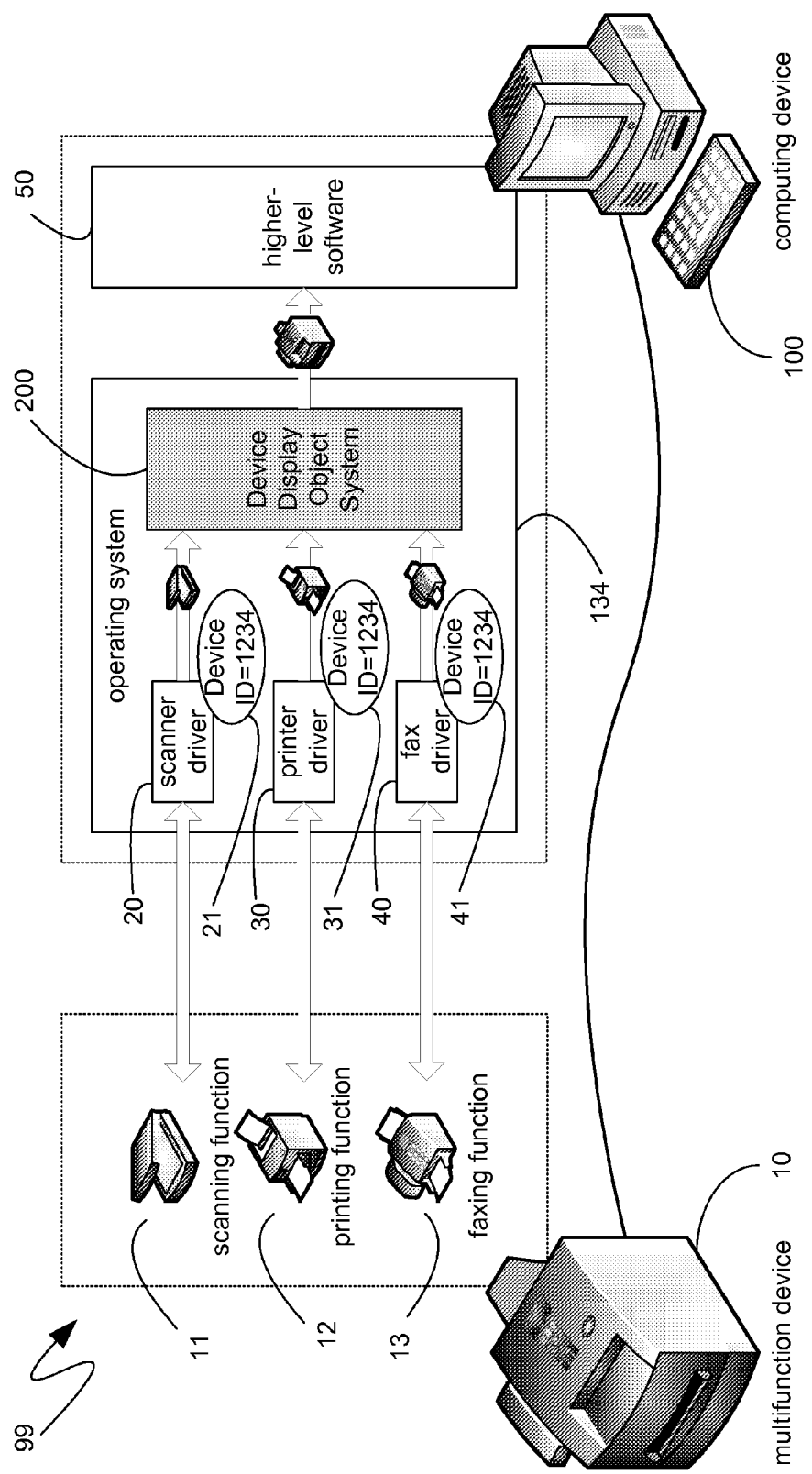
FIG. 1 is a block diagram of an exemplary connection between a multi-function device and a computing device.

The following description relates to the combination and presentation of multiple functions from devices, including some or all of the functions of a single multi-function device, into a single "device display object". A device display object infrastructure can receive information from one or more device function providers, each of which can, in turn, interface with one or more drivers or other software that communicates with the one or more devices that are capable of performing the provided functions. The device display object infrastructure can further obtain metadata associated with individual functions or the overall device display object itself and can provide, to the user or to higher-level software applications, the ability to set properties of the device display object.

The techniques described herein focus on the presentation of the multiple functions of a single physical multi-function device into a single device display object. However, the techniques described are not so limited, as the same mechanisms, described below, are equally capable of combining, into a device display object, only a subset of functions from a multi-function device or, alternatively, combining, into a single device display object, the functions from multiple physical devices and thereby creating additional multi-function devices. Consequently, the descriptions below directed to a multi-function device are illustrative only and are meant to include any combination of one or more single- or multi-function devices.

Similarly, the below mechanisms are described with reference to a multi-layer componentized environment where a higher-level "device display object infrastructure" can receive information from one or more "device function providers", which can then, in turn, be layered above one or more drivers or other components that operate at a lower-level and can communicate with the one or more devices that are capable of performing the provided functions. However, the precise division of capabilities into particular components or layers is strictly for ease of integration with existing infrastructure, and none of the below described mechanisms require a specific componentization or a specific layering of components. For example, the "device function providers" described herein, which can also be nominated "device display object providers" or "device function enumerators", can be implemented in one or more layers, or can even be integrated into the device drivers themselves. Consequently, the below descriptions are meant to be applicable to any collection of components and layering so long as the below-described information delivery and processing is present within the overall system.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 99 is illustrated comprising a multi-function device 10 and a computing device 100 that is connected to and communicating with the multi-function device. Though the descriptions will be applicable to any combination of one or more single- or multi-function devices, as indicated, for illustrative purposes the multi-function device 10 of FIG. 1 is illustrated as comprising a scanning function 11, a printing function 12 and a faxing function 13. Each of these functions can be communicating with one or more drivers or other software elements executing on the computing device 100. For example, the scanning function 11 of the multi-function device 10 can be communicating with a scanner driver 20, such as may have been provided by the manufacturer of the multi-function device, and the faxing function 13 can be communicating with a fax driver 40, such as may also have been provided by the manufacturer of the multi-function device. Similarly, the printing function 12 can be communicating with a printer driver 30, such may have been provided as part of the operating system 134 of the computing device 100, or which may have been provided by the manufacturer of the multi-function device 10.

The scanner driver 20, printer driver 30 and the fax driver 40 can each further communicate with other components executing on the computing device 100 which, for simplicity of illustration, are not specifically enumerated in FIG. 1. For example, as will be known by those skilled in the art, in addition to individual drivers, various other systems exist to enable the higher level software 50 executing on the computing device 100 to utilize the various functions of a peripheral, such as the multi-function device 10. For example, various plug-and-play systems can be provided, such as by the operating system 134 of the computing device 100, to enable users to merely connect a peripheral to a computing device and enable its usage without additional effort. Such plug-and-play systems, as will also be known by those skilled in the art, can comprise multiple layers of components that can interoperate with one another to provide access to one or more functions of a device to the user and other software executing on a computing device. In the illustrative example of FIG. 1, the printer driver 30 can communicate with a plug-and-play system, such as can be provided by the operating system 134, and the plug-and-play system can then, in turn, communicate with further upstream components, such as the illustrated device display object system 200.

In one embodiment, a centralized device display object system 200 can, directly or indirectly, interface with individual drivers, such as drivers 20, 30 and 40, and with larger systems, such as a plug-and-play system, to expose, to higher-level software 50, not a disparate collection of functions, but rather a unified device display object that can, in one embodiment, mirror the physical multi-function device 10 that the user has connected to the computing device. The device display object system 200 can reference identifying information, such as device identifiers 21, 31 and 41 obtained, or derived by, the scanner driver 20, printer driver 30 and fax driver 40, respectively, to determine which functions should be subsumed within a single device display object. The precise mechanisms by which identifiers, such as device identifiers 21, 31 and 41 are obtained by the scanner driver 20, printer driver 30 and fax driver 40, respectively, are not relevant to the present descriptions and they can be obtained in any manner including direct provision by the multi-function device 10 itself, or derivation by the scanner driver, plug-and-play system, or fax driver.

Figure 2:
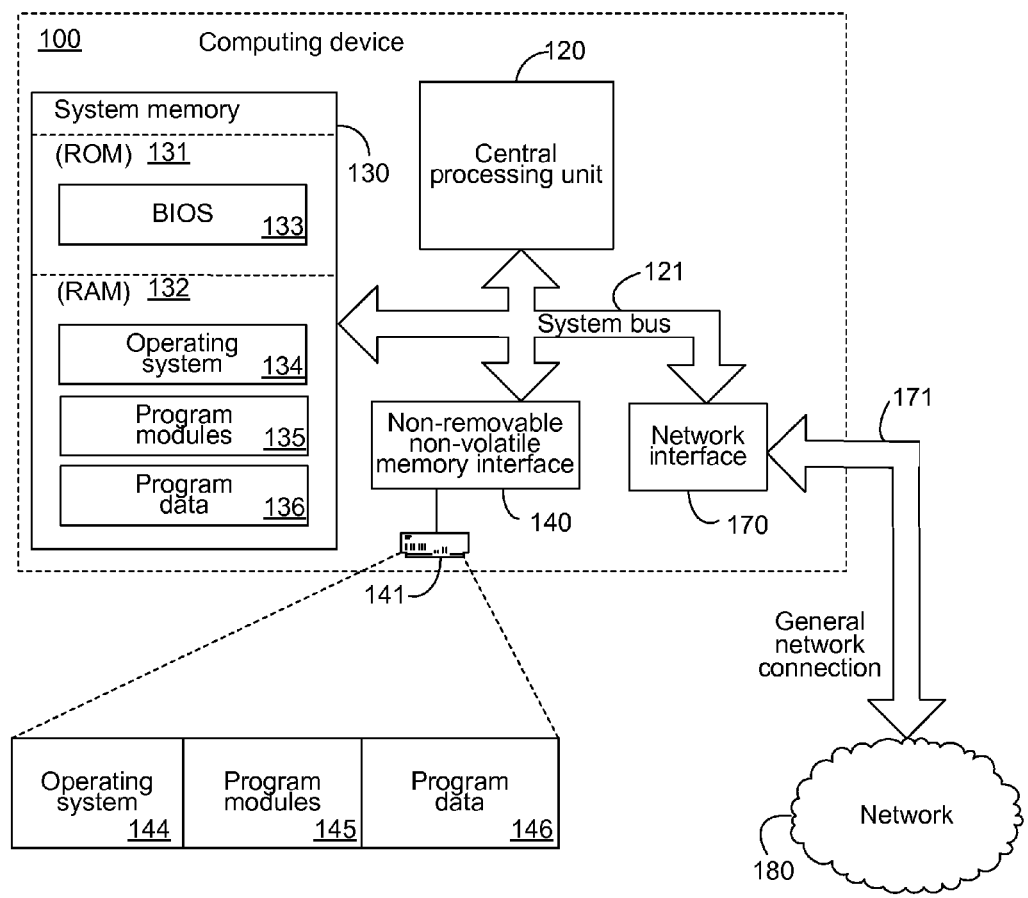
FIG. 2 is a block diagram of an exemplary computing device.

Before proceeding with further detailed descriptions of the device display object system 200, the framework for the below descriptions is provided with reference to FIG. 2, wherein an exemplary computing device 100, such as the one from FIG. 1, is further illustrated. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 2 to be connected to a network 180 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
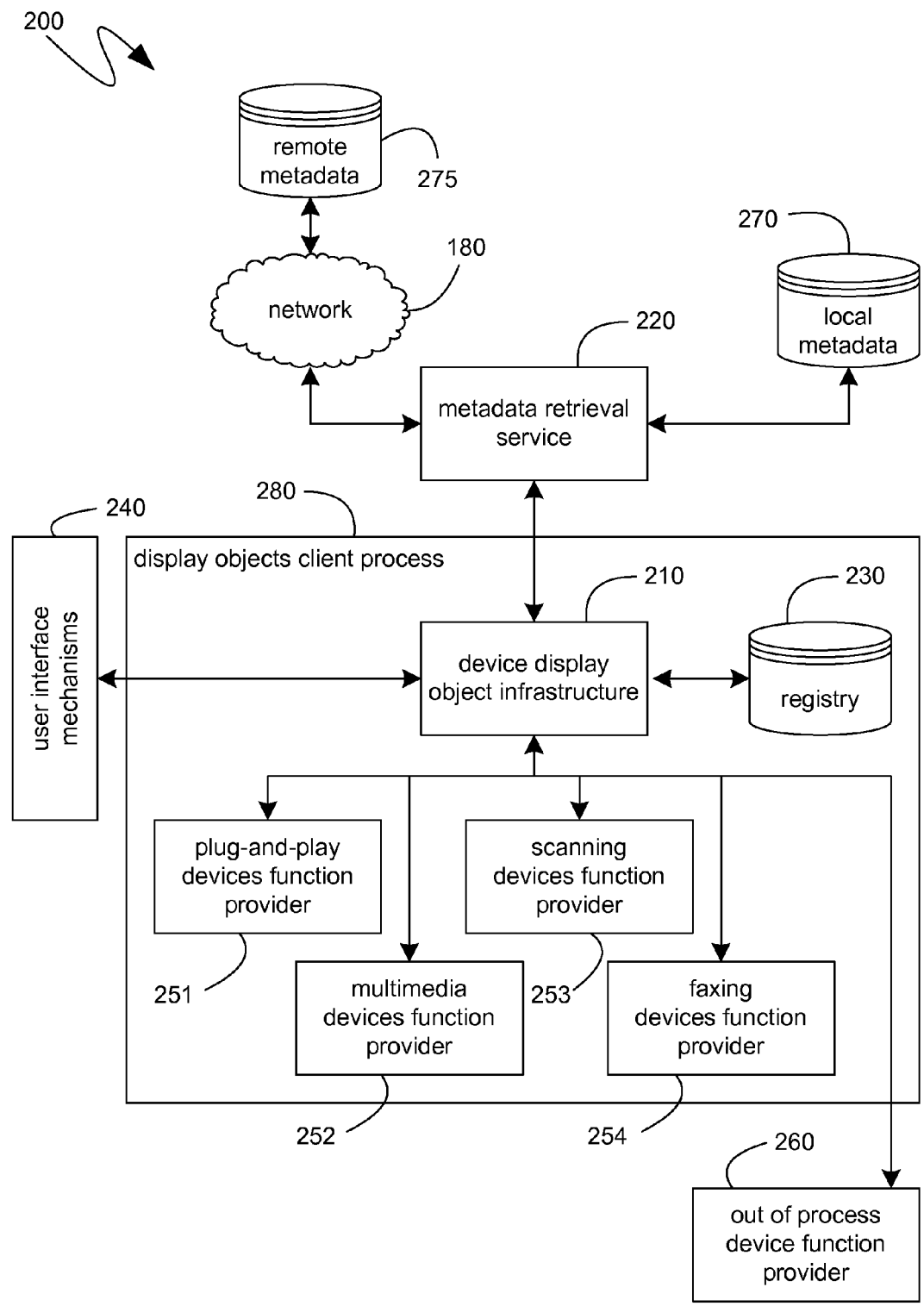
FIG. 3 is a block diagram of an exemplary function grouping infrastructure.

Turning to FIG. 3, the device display object system 200 shown in FIG. 1 is illustrated in greater detail. In one embodiment, the device display object system 200 can comprise a display objects client process 280, user interface mechanisms 240 and a metadata retrieval service 220 that can communicate with one or more local metadata stores 270 and, or alternatively, one or more remote metadata services 275 via the network 180. In the illustrated embodiment, the display device client process 280 can comprise a device display object infrastructure 210 that can act as a centralizing agent for collecting information and generating the device display object. The display device client process 280 can further comprise access to the registry 230 and various device function providers, such as a plug-and-play devices function provider 251, a multimedia devices function provider 252, a scanning devices function provider 253 and a faxing devices function provider 254. In addition to the device function providers that can, in one embodiment, execute within the display objects client process 280, out of process device function providers 260 can likewise communicate with, and provide information to, the device display object infrastructure 210.

Device function providers, such as the device function providers 251, 252, 253, 254 and 260, enumerated above, can communicate, either directly or indirectly, with one or more devices that actually provide the relevant functions and can then, in turn, provide information obtained regarding those one or more devices and their functions to the device display object infrastructure 210. In one embodiment, each device function provider can communicate with lower-level software, such as dedicated drivers, a plug-and-play system, and other like pre-existing software that can provide more direct and specific control of one or more functions provided by one or more devices. Each device function provider can be tailored to such lower-level software, facilitating its interface therewith. For example, as illustrated in FIG. 3, a scanning devices function provider 253 can be tailored to interface with scanner drivers, such as the scanner driver 20, by supporting and utilizing interfaces and functionality commonly associated with scanner drivers. Similarly, a faxing devices function provider 254 can be tailored to interface with fax drivers, such as the fax driver 40, by supporting and utilizing those interfaces and functionality that are commonly associated with fax drivers.

In some cases, access to functions can be provided to higher level software 50 through a pre-existing system having multiple levels of software. For example, as will be known by those skilled in the art, the printer driver 30 can interface with a plug-and-play system that can comprise multiple levels. In such a case, a function provider can interface with the overall plug-and-play system. Thus, as illustrated, a plug-and-play devices function provider 251 can be tailored to interface with a plug-and-play system by supporting and utilizing those interfaces and functionality supported by the plug-and-play system.

While the illustrated plug-and-play devices function provider 251, scanning devices function provider 253 and other device function providers are shown as executing as part of the display objects client process 280, they can, in an alternative embodiment, execute outside of the display objects client process, since the precise process boundaries of each of these components is not material. Additionally, the device display object infrastructure 210 can interface with both device function providers that execute as part of the display objects client process 280, such as device function providers 251, 252, 253 and 254, described above, and it can interface with device function providers that execute within their own, or another, process, such as the out of process device function provider 260. In the latter case, the communication between the out of process function provider 260 and the device display object infrastructure 210 can occur via inter-process communication, but can otherwise remain analogous to that described below.

The device function providers can obtain, from the lower-level software they are designed to interface with, specific information that the device function providers can then provide to the device display object infrastructure 210 to enable the device display object infrastructure to generate a device display object and provide access to such an object to higher level software 50. In one embodiment, the device function providers can provide some or all of the following information regarding the device with which the device function provider is interfacing: a unique device identifier for the device, the model name of the device, the model number of the device, the manufacturer of the device, an indication of whether the device is currently connected, an indication of the type of connection, such as a networked connection, through which the device is currently connected, a display icon for the device, an indication of whether the device is currently operating properly, and similar information. In addition, the device function providers can provide some or all of the following information for each function of which the function providers are aware: an identifier of the interface through which the function can be accessed, an indication of whether the interface is enabled, information that can be used to enable the interface and other like information.

Based on the information provided by the device function providers, the device display object infrastructure 210 can create and maintain a device display object that can, in one embodiment, comprise the following information: a name of the device display object, a unique device identifier for that device, an indication whether the device is currently connected, an icon for the device, a classification of the device, a pointer to any metadata associated with the device, an indication of the type of connection, such as a networked connection, through which the device is currently connected, an indication of whether the device is currently operating properly, an indication of whether the device is the default device, and other like information. In creating and maintaining such a device display object, the device display object infrastructure 210 can reference, not only the information received from the device function providers, such as device function providers 251, 252, 253, 254 and 260, but also information received from the user based on knowledge they possess or express about the device or its usage, such as information that may be received through user interface mechanisms 240, information previously stored in the registry 230, such as by the plug-and-play system, and metadata, such as that obtained by the metadata retrieval service 220, which can obtain metadata from either or both a local metadata repository 270 and a remote metadata repository 260.

In one embodiment, the device display object infrastructure 210 can determine which functions, reported to it by device function providers, such as the device function providers 251, 252, 253, 254 and 260 enumerated above, are to be combined into a single device display object. For example, a single device display object can be created to represent the single multi-function device 10 of FIG. 1, in which case that single device display object can encompass all of the functions 11, 12 and 13 that are provided by the multi-function device. The device display object infrastructure 210 can receive information regarding the printing function 12 from the plug-and-play devices function provider 251, information regarding the scanning function 11 from the scanning devices function provider 253 and information regarding the faxing function 13 from the faxing devices function provider 254. In one embodiment, the information regarding the scanning function 11, the printing function 12 and the faxing function 13 can, individually, include device identifiers 21, 31 and 41, respectively, that can be identical to one other. Such a common device identifier can be used by the device display object infrastructure 210 as the basis by which to determine that the scanning function 11, the printing function 12 and the faxing function 13 may be grouped into a single device display object.

In addition to device identifiers, the device function providers can provide, to the device display object infrastructure 210, any of the above enumerated information. In some cases, the information provided may be specific to a particular function and can, therefore, remain associated with that function within the device display object. More commonly, however, the information provided by the device function provider can be used by the device display object infrastructure 210 to set or modify the properties of the device display object. In such a case, the device display object infrastructure 210 can determine which function's information will be used as the corresponding information for the device display object. For example, the plug-and-play devices function provider 251 may have provided, to the device display object infrastructure 210, one model name for the multi-function device 10 while the scanning devices function provider 253 may have provided a slightly different model name and the faxing devices function provider 254 may have provided yet a third, again slightly different, model name. Such a difference in model names can occur in many circumstances, including the independent programming of printing function 12, the scanning function 11, and the faxing function 13, respectively, of the multi-function device 10.

In one embodiment, the device display object infrastructure 210 can resolve such a conflict, and select the model name associated with the device display object from among the model names provided by the device function providers 251, 253 and 254, based on a ranking of the respective functions of the devices, such as, in the present example, functions 12, 11 and 13, respectively. For simplicity, a static ranking can be used whereby, for example, a printing function is always ranked higher than any other function, and a scanning function is ranked higher than a faxing function. In an alternative embodiment, however, a dynamic ranking can be applied, such as by letting the user select a particular ranking, or adjusting the ranking based on user actions. For example, the ranking could be adjusted based on the frequency with which a user accesses a particular one of the functions of the device display object. Alternatively, the ranking can be dictated by information received from the metadata retrieval service 220.

Returning to the above example, the discrepancy between the model name, as provided to the device display object infrastructure 210 by the plug-and-play devices function provider 251, the scanning devices function provider 253 and the faxing devices function provider 254 can be resolved by the device display object infrastructure by simply selecting the model name as provided by the plug-and-play devices function provider because, in one embodiment, the printing function 12 can have a higher ranking than either the scanning function 11 or the faxing function 13. If the plug-and-play devices function provider 251 did not provide an indication of a model name, the next most highly ranked function, such as, for example, the scanning function 11, can be referenced and the model name provided by the faxing devices function provider 254 can be used. In such a manner, the information provided by device function providers, such as device function providers 251, 252, 253, 254 and 260, can be used by the device display object infrastructure 210 to set at least some of the properties of the device display object.

The possibility exists that the information provided by a device, that is ultimately received by device function providers and then provided to the device display object infrastructure 210, can be inaccurate. Thus, in one embodiment, rather than relying exclusively on information provided by device function providers, the device display object infrastructure 210 can reference metadata, either locally maintained, or remotely stored, to set at least some of the properties of a device display object. Because such metadata may be more accurate, or at least more recent, than information that had been provided to a device at the time of its manufacture, the device display object infrastructure 210 can, in one embodiment, reference the metadata to set the device display object's properties, giving such metadata higher priority than the information received from device function providers.

As illustrated in FIG. 3, in one embodiment, a metadata retrieval service 220 can provide the device display object infrastructure 210 with metadata that can be used by the device display object infrastructure to set at least some of the properties of the device display object. As shown, a remote metadata service 275, such as a web service, can be accessed by the metadata retrieval service 220 via the network 180. Similarly, the metadata retrieval service 220 can access a local metadata storage 270.

In one embodiment, the metadata retrieval service 220 can initially seek to access the remote metadata service 275 because the remote metadata service can be an authoritative source of metadata. For example, the remote metadata service 275 may have access to current metadata maintained by various peripheral device manufacturers. Consequently, the singular remote metadata service 275 illustrated in FIG. 3 is meant to represent any one or more collections of metadata, and associated services, that are remote from the computing device 100. Such remote metadata services 275 can be identified by the peripheral devices, and such identification can be provided to the device display object infrastructure 210 by the device function providers. The device display object infrastructure 210 can then, in turn, provide such information to the metadata retrieval service 220 to enable the metadata retrieval service to locate and communicate with an appropriate remote metadata service 275.

In an alternative embodiment, a local metadata storage 270 can be referenced, either instead of, or in addition to, the remote metadata service 275. For example, the local metadata storage 270 can be referenced if the metadata retrieval service 220 cannot establish a communicational connection to the remote metadata service 275. The local metadata storage 270 can, in one embodiment, comprise information analogous to that available from the remote metadata service 275. For example, the local metadata storage 270 can comprise a condensed or filtered version of the information available from the remote metadata storage 260, and can have been provided to the computing device 100 by the same manufacturer supporting the remote metadata storage, such as when a set of drivers, such as the scanner driver 20, were obtained from the manufacturer and installed on the computing system.

The metadata available from either the remote metadata service 275 or the local metadata store 270 can comprise information that can be used by the device display object infrastructure 210 to set, or edit, one or more properties of the device display object. For example, the metadata can include an icon that can represent the physical device associated with the device display object. Similarly, the metadata can include information that can facilitate the ordering of any consumables, such as ink or toner, that the device that is associated with the device display object uses. As yet another example, the metadata can provide pointers, such as a web page address, to additional information regarding the device that is associated with the device display object.

As indicated previously, one advantage of the device display object is the correspondence between such an object and a physical device; irrespective of the number of functions that may be exported by the physical device. The device display object, therefore, can be exposed to the user through user interface mechanisms 240. In one embodiment, such mechanisms can comprise the standard display and modification mechanisms for the one or more functions encompassed by the device display object. For example, if the device display object was created as a representation of the multi-function device 10, such that the device display object encompasses the printing function 12, the user interface mechanisms 240 can comprise the printing user interface traditionally provided by the operating system 134. In another embodiment, the user interface mechanisms 240 can comprise multiple user interfaces such that, for example, the device display object associated with the multi-function device 10 can be accessible to the user through both a printing user interface, a scanning user interface and a faxing user interface.

The user interface mechanisms 240 can enable a user, or other software, such as the higher-level software 50, to create or modify one or more of the properties of the device display object. For example, a user can be allowed to assign, or edit, the name of the device associated with the device display object. Similarly, a user can be allowed to select whether a representation of the device associated with the device display object is shown in a listing, or other user interface, that enumerates available devices or, alternatively, whether the device is to remain "hidden" and not be shown in such an interface.

The changes or additions made to the properties of the device display object by a user or higher-level software 50 can, in one embodiment, be stored by the device display object infrastructure 210 in the registry 230 for future reference and to prevent the user from having to make the same edits multiple times. Because such user-specified values reflect specifically-set user preferences and can, therefore, trump default property values derived from other sources, in one embodiment, the device display object infrastructure 210 can first reference the registry 230 for such user-specified values prior to obtaining metadata from the metadata retrieval service 220, and prior to utilizing information obtained from the device function providers for setting properties of the device display object.

Figure 4:
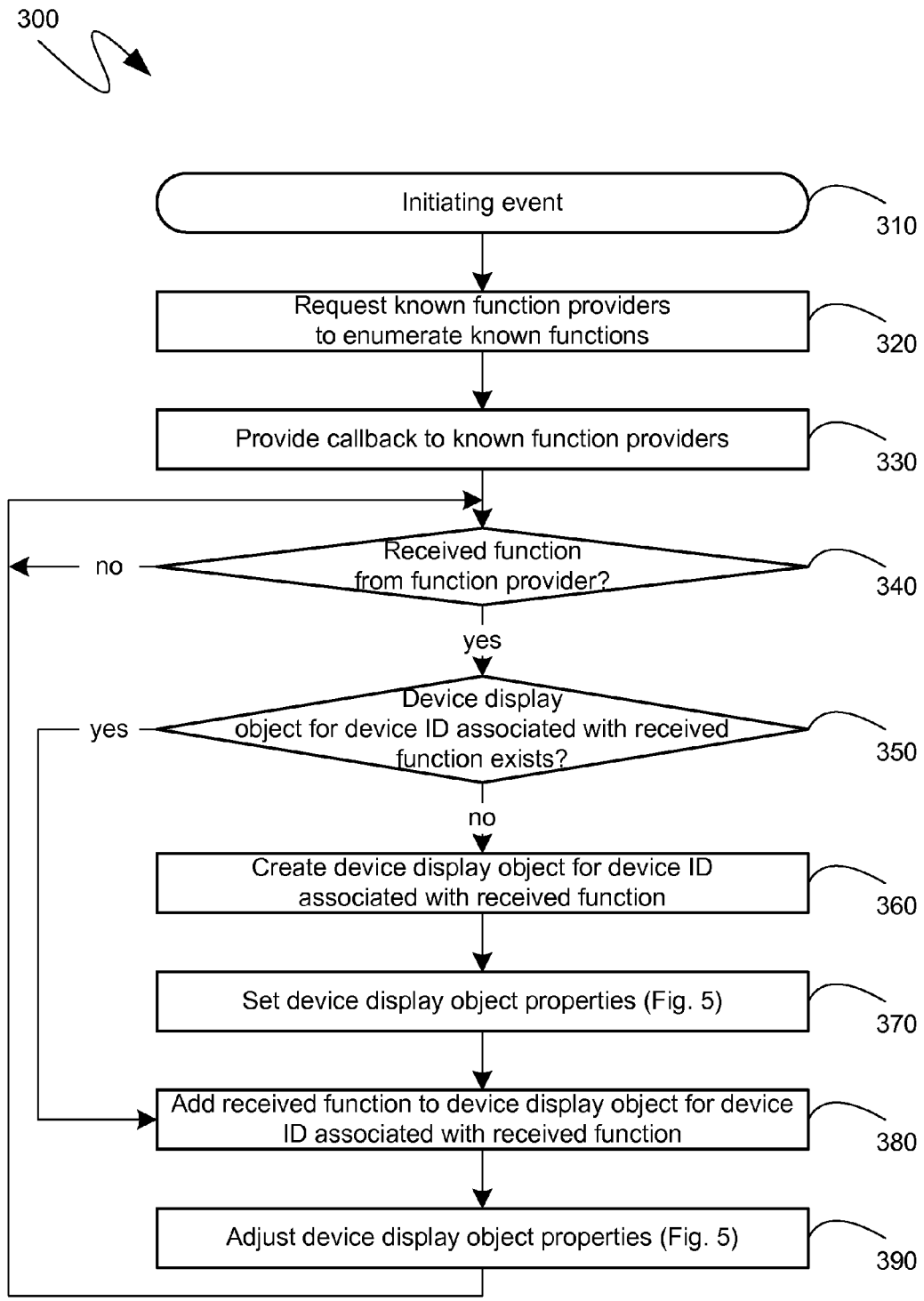
FIG. 4 is a flow diagram of an exemplary multi-function object creation and maintenance mechanism.

Turning to FIG. 4, a flow diagram 300 is shown, illustrating an exemplary process for creating and maintaining a device display object. As shown, an initiating event 310 can trigger the requesting of the enumeration of known functions by known function providers at step 320. The initiating event of step 310 can, in one embodiment, be the initialization of the device display object infrastructure 210 or, more generally, the display objects client process 280. Traditionally, such an initialization would occur upon startup of the computing device 100, though such an initialization can also occur at any other time. Alternatively, or in addition, step 310 can comprise initiating events that can provide a specific trigger to the device display object infrastructure 210 even if it is already executing, such as an explicit user command to reset the system.

After the initiating event at step 320, the function providers, such as function providers 251, 252, 253, 254 and 260, enumerated above, that are known to the device display object infrastructure 210 can be each, in turn, requested to enumerate the functions of devices of which those function providers are aware. In an alternative embodiment, step 320 can comprise the request to enumerate known functions only to a sub-set of the known function providers. For example, if the initiating event at step 310 was the detection, or other addition, of a new function provider, then, at step 320, a request to enumerate known functions can be directed only to that newly detected function provider.

In conjunction with the request to enumerate known functions at step 320, a callback function can be provided to the function providers at step 330 to enable the function providers to notify the device display object infrastructure 210 of new functions of which such function providers may become aware. Thus, for example, if a new device is connected to the computing device 100, then the functions of such a device can be detected by, or otherwise communicated to, one or more appropriate function providers, and such function providers can notify the device display object infrastructure 210 of the new functions through the callback function provided at step 330. As will be recognized by those skilled in the art, the exact order of steps 320 and 330 is not critical, and the order may differ from that illustrated in flow diagram 300 without impacting the overall functionality described.

After requesting the enumeration of known functions, and after providing the callback to the function providers, the device display object infrastructure 210, or other appropriate component, can, at step 340, wait until information regarding a function is received from a device function provider. Once such information is received, an initial determination can be made at step 350 to determine if a device display object already exists with which the function should be associated. As indicated previously, in one embodiment, a device identifier, such as can be provided by the physical device, or which can be derived by a function provider, can be utilized to determine which functions should be grouped into a common device display object. Such an arrangement can provide a single device display object for a single physical device, irrespective of the number of functions provided by such a device. In such a case, at step 350, a comparison can be made between the device identifier associated with the function information provided at step 340 and the device identifiers associated with currently existing device display objects to determine if the newly received function is to be combined with an existing device display object. In an alternative embodiment, other identification mechanisms, or even explicit user choice, can be utilized at step 350 to determine whether to combine the newly received function with an existing device display object.

If, at step 350, it is determined that the newly received function is to be combined with an existing device display object, processing can skip to step 380, where the function can be added to the device display object. In one embodiment, such an addition can comprise modification of the device display object to include a function instance or device interface corresponding to the newly received function. In another embodiment, the addition of a new function to a device display object can entail the reevaluation of the properties of the device display object. In particular, as indicated previously, and as will be described further below, the properties of a device display object can be set with reference to information associated with the function, obtained from a device function provider, in accordance with the ranking of the function among the other functions encompassed by the same device display object. Thus, if the function whose information was received at step 340 is a higher ranked function than the functions previously comprising the device display object, the properties of such a device display object may change with the addition of the newly added, more highly ranked, function. Consequently, at step 390, a reevaluation, and possible modification, of the device display object's properties can be performed, such as in accordance with the mechanisms described below with reference to FIG. 5.

If, at step 350, it is determined that the newly received function is separate from any existing device display function, a new device display object for the newly received function can be created at step 360. Subsequently, at step 370, the properties of the newly created device display object, comprising the newly received function, can be set, such as in accordance with the mechanisms described below with reference to FIG. 5. In one embodiment, the setting of the properties of a newly created device display object, such as at step 370, can be performed by the same mechanisms as the adjustment of the properties of an existing device display object that has had a newly received function associated with it, such as at step 390.

Figure 5:
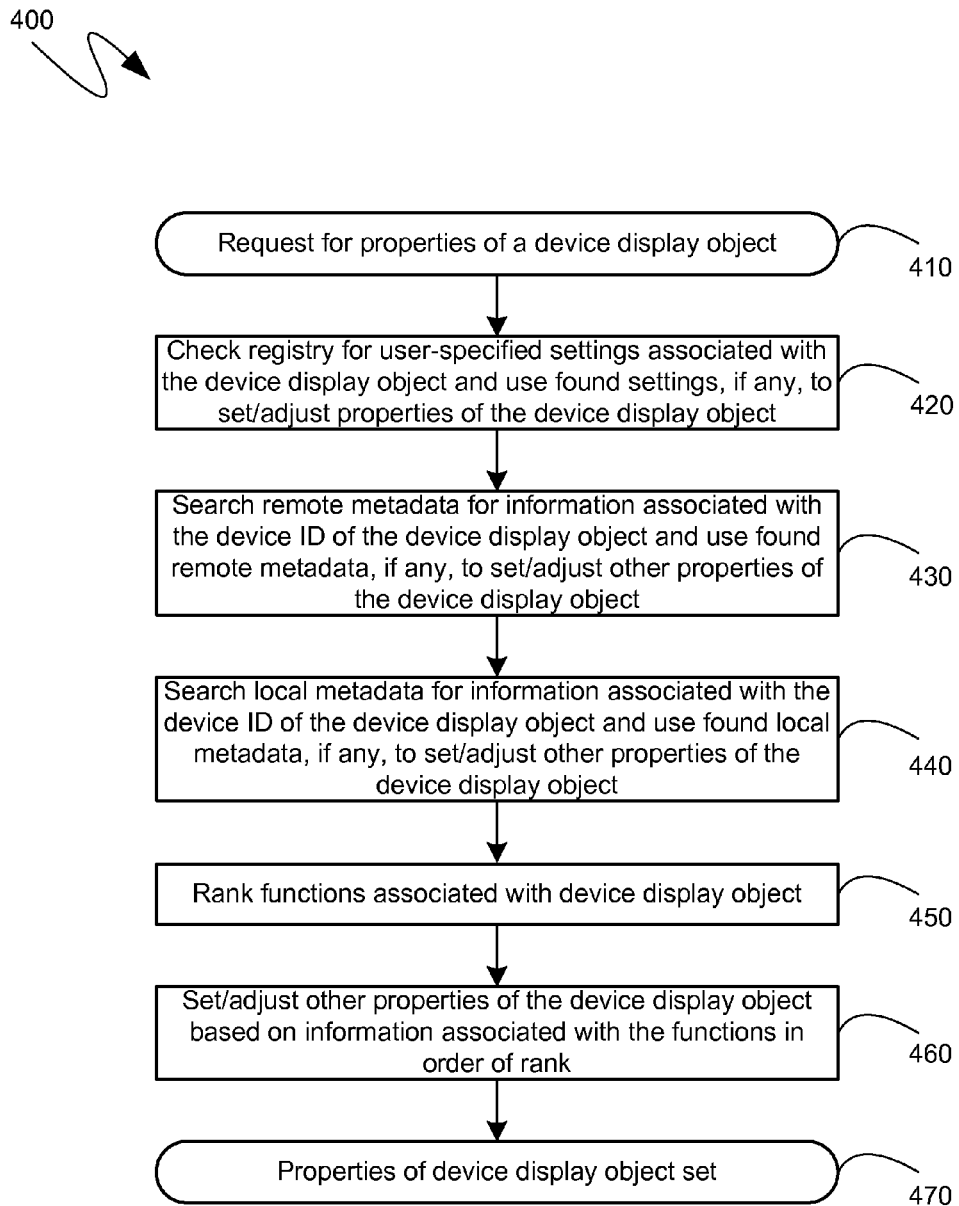
FIG. 5 is a flow diagram of an exemplary multi-function object property association mechanism.

Turning to FIG. 5, a flow diagram 400 is shown, illustrating the setting, or adjusting, of properties of a device display object, such as could occur at steps 370 and/or at steps 390, illustrated above. A triggering event can occur at step 410, whereby a request, or other action, is made with respect to the properties of a device display object. In one embodiment, the trigger of step 410 can be the setting of properties as would be initiated by step 370, whereas in another embodiment, the triggering event can be the adjustment of properties as would be initiated by step 390.

In one embodiment, the properties of the device display object can first be set with reference to the registry 230, or other appropriate storage location, to identify and locate any user settings that may be stored there. Thus, at step 420, the registry 230 can be checked for settings associated with an identifier used to identify the device display object, such as a device identifier received from a device function provider and associated with the functions of the device display object. In one embodiment, settings in the registry 230 can be stored in accordance with a categorization, or classification, of the device represented by the device display object. Such a categorization can be derived by reference to the functions and interfaces that are encompassed by the device display object. For example, if the device display object encompasses functionality commonly associated with a printer, then the device associated with the device display object can be categorized as a printer for purposes of storing information into the registry 230. Such a categorization can be informed by the ranking of functions of the device display object described above. Thus, for example, if a device display object encompassed both printing and scanning functionality, the higher ranking of the printing function can cause the device associated with the device display object to be categorized as a printer. In an alterative embodiment, however, a device can be categorized as both a printer and a scanner, enabling settings to be stored in accordance with both classifications.

The settings in the registry 230 can, in a further embodiment, be stored such that a device display object exposes a property that lists a model identifier of the device represented by the display object, hardware identifiers of the device and interface classes of the device. Such a storage structure can make it possible to associate other pieces of software or functionality with the device represented by the device display object on the basis of the listed identifiers. For example, a model identifier can be used as a topmost class, with hardware identifiers being used as sub-classes in order of ranking of the functions with which such hardware identifiers are associated. The class structure of the device display object can provide information to existing processes, such as processes executing as part of the operating system 134. For example, shell processes of the operating system 134 can utilize the classes stored in the registry 230, and the information stored within those classes, to populate user interface elements, such as drop-down menus, that can be associated with the device display object. In one embodiment, the device display object classes can comprise a list of "verbs", or operations that the device associated with the device display object can perform. Those operations can then be presented to a user by user interface elements that are pre-programmed to reference the registry 230.

Turning back to FIG. 5, after setting, or adjusting, the appropriate properties of a device display object with any settings in the registry 230, or from any other storage location that comprises user-specified settings, the remote metadata storage 260 can be queried by the metadata retrieval service 220 to determine, at step 430, if there are any other settings or other information that can be used to set the other settings of the device display object. As indicated previously, in one embodiment, an identifier of the device associated with the device display object, such as a model identifier or a hardware identifier, can be used to identify and locate any metadata relevant to the device display object at the remote metadata storage 260. If, at step 430, it is determined that such remote metadata exists, then it can be utilized to set the appropriate properties of the device display object that were not already set previously at step 420. For example, the remote metadata storage 260 can provide an updated device model identification, or an icon of the device associated with the device display object, which can be used to set the appropriate properties of the device display object.

In one embodiment, illustrated by flow diagram 400, a local metadata storage 270 can be referenced at step 440 even if the remote metadata storage 260 comprised information regarding the device associated with the device display object. In an alternative embodiment, step 440 can be performed only if the remote metadata storage 260 did not include any information used, at step 430, to set any of the properties of the device display object. The searching, at step 440, of local metadata storage 270 for information that is relevant to the device associated with the device display object, and the setting of properties of the device display object if such information is found, can occur in an analogous manner to that described above with reference to step 430. If both the local and remote metadata storage 270 and 260, respectively, are checked, then, in one embodiment, the information obtained from the remote metadata storage can supersede any conflicting information obtained from the local metadata storage.

As indicated previously, the functions encompassed by the device display object can be ranked to provide a meaningful mechanism by which to identify information associated with the functions that can be utilized to set one or more properties of the device display object. The ranking performed at step 450 can be a static ranking or a dynamic ranking, as described above. In addition, while the ranking is illustrated at step 450, it is not dependent on any of the prior steps of the flow diagram 400 and, consequently, could occur prior to, or in parallel with, any of the steps 420, 430 or 440.

At step 460, the information associated with the functions that are encompassed by the device display object can be utilized to set, or adjust, any of the properties of the device display object that were not set previously by steps 420, 430 or 440. In one embodiment, information associated with the highest ranked function can be referenced first and utilized to set appropriate properties of the device display object. Information associated with the next highest ranked function can be subsequently referenced, and information associated with lower ranked functions can be referenced in reverse order of the function's ranking. After the information associated with the various functions encompassed by the device display object is referenced and, if appropriate, utilized to set appropriate properties of the device display object at step 460, the processing can end at step 470 and the properties of the device display object can be considered to be set until a subsequent triggering event, such as that of step 410.

As can be seen from the above descriptions, mechanisms for creating and maintaining a device display object that can encompass one or more functions from one or more devices have been provided. In view of the many possible variations of the subject matter described herein, we claim as our invention all such embodiments as may come within the scope of the following claims and equivalents thereto.

We claim:
1. One or more computer-readable storage media comprising computer-executable instructions for creating and main- taining a single device display object encompassing at least two functions, the computer-executable instructions directed to steps comprising:

requesting enumeration of known functions from at least two known device function providers;

aggregating at least two separately enumerated functions within the single device display object;

ranking the at least two separately enumerated functions encompassed within the single device display object;

setting at least some properties of the single device display object in accordance with information, associated with a device identifier of a device providing the at least two separately enumerated functions, that is obtained from a metadata store; and setting at least some properties of the single device display object such that information associated with a higher ranked function supersedes conflicting information associated with a lower ranked function.

2. The computer-readable storage media of claim 1 comprising further computer-executable instructions for selecting the at least two separately enumerated functions for encompassing within the single device display object by selecting enumerated functions that are each, independently, associated with the device identifier.

3. The computer-readable storage media of claim 2, wherein the single device display object comprises an icon representing a single multi-function device providing the at least two separately enumerated functions encompassed within the single device display object.

4. The computer-readable storage media of claim 1, wherein the ranking the at least two separately enumerated functions is performed in accordance with a dynamic ranking algorithm based on a frequency with which individual ones of the at least two separately enumerated functions are invoked by a user.

5. The computer-readable storage media of claim 1, wherein the metadata store is a remote metadata service identified by a single multi-function device providing the at least two separately enumerated functions encompassed within the single device display object.

6. The computer-readable storage media of claim 1 comprising further computer-executable instructions for: assigning a primary category to the single device display object based on the at least two separately enumerated functions aggregated within the single device display object and based on the ranking of the at least two separately enumerated functions; and storing information associated with the single device display object into a registration database categorized in accordance with the assigned primary category.

7. The computer-readable storage media of claim 1 comprising further computer-executable instructions for: storing user-selected values for user-settable properties of the single device display object; and setting at least some properties of the single device display object in accordance with the user-selected values such that the user-selected values supersede conflicting values received from other sources.

8. The computer-readable storage media of claim 7, wherein the user-settable properties include a hide/show property for selecting whether an indication of a device associated with the single device display object is presented in a relevant user interface element.

9. A method for creating and maintaining a single device display object encompassing at least two functions, the method comprising the steps of:

requesting enumeration of known functions from at least two known device function providers;

aggregating at least two separately enumerated functions within the single device display object;

ranking the at least two separately enumerated functions encompassed within the single device display object;

setting at least some properties of the single device display object in accordance with information, associated with a device identifier of a device providing the at least two separately enumerated functions, that is obtained from a metadata store; and setting at least some properties of the single device display object such that information associated with a higher ranked function supersedes conflicting information associated with a lower ranked function.

10. The method of claim 9 further comprising the step of selecting the at least two separately enumerated functions for encompassing within the single device display object by selecting enumerated functions that are each, independently, associated with the device identifier.

11. The method of claim 10, wherein the single device display object comprises an icon representing a single multi-function device providing the at least two separately enumerated functions encompassed within the single device display object.

12. The method of claim 9, wherein the ranking the at least two separately enumerated functions is performed in accordance with a dynamic ranking algorithm based on a frequency with which individual ones of the at least two separately enumerated functions are invoked by a user.

13. The method of claim 9, wherein the metadata store is a remote metadata service identified by a single multi-function device providing the at least two separately enumerated functions encompassed within the single device display object.

14. The method of claim 9 further comprising the step of assigning a primary category to the single device display object based on the at least two separately enumerated functions aggregated within the single device display object and based on the ranking of the at least two separately enumerated functions; and storing information associated with the single device display object into a registration database categorized in accordance with the assigned primary category.

15. The method of claim 9 further comprising the steps of: storing user-selected values for user-settable properties of the single device display object; and setting at least some properties of the single device display object in accordance with the user-selected values such that the user-selected values supersede conflicting values received from other sources.

16. The method of claim 15, wherein the user-settable properties include a hide/show property for selecting whether an indication of a device associated with the single device display object is presented in a relevant user interface element.

17. A system for creating and maintaining a single device display object representing a multi-function device, the system comprising:

the multi-function device providing multiple distinct functions;

multiple device function providers associated with the multi-function device;

a device display object infrastructure for creating the single device display object aggregating at least two separately enumerated functions, enumerated by the multiple device function providers to the device display object infrastructure, wherein the device display object infrastructure sets properties of single device display object such that information associated with a higher ran function supersedes conflicting information associated with a lower ranked function;

a remote metadata service that is identified by the multi-function device; and a metadata retrieval service for obtaining information associated with the multi-function device from the remote metadata service and providing it to the device display object infrastructure.

18. The system of claim 17, wherein the single device display object comprises user-settable properties.

19. The system of claim 17, wherein the device display object infrastructure creates the single device display object based on a common device identifier associated with each of the at least two separately enumerated functions.

* * * * *